3,367,867
LOW-FOAMING OVERBASED PHENATES
Andrew D. Abbott, Greenbrae, and Nylen L. Allphin,
Jr., Pinole, Calif., assignors to Chevron Research Company, San Francisco, Calif., a corporation of Delaware
No Drawing. Filed Jan. 4, 1966, Ser. No. 518,551
9 Claims. (Cl. 252—33.4)

ABSTRACT OF THE DISCLOSURE

Sulfurized alkylphenol compositions providing low-foaming and low viscosity overbased phenates wherein the alkyl groups are a mixture of straight and branched chain alkyl.

---

This invention concerns novel compositions which find use in the preparation of overbased alkylphenates, the phenates prepared therefrom and the process used for the preparation of the phenates.

Basic sulfurized calcium alkylphenates are used as compounding agents in lubricating oils to neutralize harmful acids in internal combustion engines and to inhibit corrosion, piston ring sticking and gum formation resulting from oxidation of the lubricating oil and oxidative polymerization of the engine fuel residues. Increasing demands on the detergency, dispersancy and acid neutralizing capabilities of sulfurized calcium alkylphenates have led to continual improvements in the phenates, as well as increasing amounts of calcium being incorporated in the phenates. The larger mole ratios of calcium to phenol which have been achieved have not only created problems in the phenates' manufacture, but also in the phenates' compounding in lubricating oils.

Recently, U.S. Patent No. 3,178,368, issued April 13, 1965, disclosed a process for preparing sulfurized calcium alkylphenates having base ratios (ratio of calcium to phenolic hydroxyl) of up to 4.5. It was found in preparing the sulfurized overbased calcium alkylphenates, that at high calcium to phenol mole ratios the phenates were extremely viscous unless inefficiently large amounts of diluent were used; also, foaming was a serious problem despite the use of a variety of conventional antifoaming agents. Moreover, the foaming persisted when the alkylphenate was compounded in lubricating oils creating undesirable foaming during the operation of the lubricated engine.

Pursuant to this invention, overbased sulfurized calcium alkylphenates of relatively low viscosity, having low foaming and high calcium content and demonstrating excellent properties as detergents in lubricating oils, are prepared by employing a mixture of sulfurized straight chain alkylphenols and branched chain alkylphenols, using an increasing amount of straight chain alkylphenol with decreasing sulfur content of the sulfurized alkylphenols and/or decreasing chain length of the normal alkyl group of the alkylphenol and incorporating the mixture of sulfurized alkylphenolic compounds in the preparation of overbased phenates. The compositions of this invention when incorporated in overbased phenates do not in themselves preclude foaming, but it is their effect in combination with antifoaming agents—conventionally used with the prior art phenates—that avoids the foaming problem.

The sulfurized alkylphenolic compositions which find use in the preparation of the phenates have the following formula:

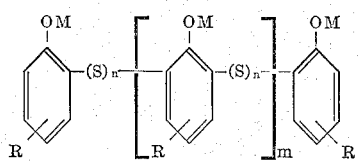

wherein $m$ is 0 or greater, usually 0 to 2, $n$ is generally from 1 to 3 and more usually from 1 to 2, M is hydrogen or calcium, when calcium, the second valence may be satisfied by phenoxide, alkoxide or hydroxide, the weight percent of sulfur is in the range of 5 to 15, and from 5 to 40 number percent of the alkyl groups are straight chain alkyl groups of from 15 to 35 carbon atoms, while from 95 to 60 percent of the alkyl groups are polypropenyl of from about 9 to 18 carbon atoms, the number percent of straight chain alkyl groups diminishing with increasing sulfur content of the sulfurized alkylphenol and increasing chain length of the straight chain alkyl groups of the alkylphenol. Of course, more than the necessary percentage of the straight chain alkyl groups may be used to achieve the desired end results.

The above compositions may be prepared by sulfurizing a mixture of branched chain alkylphenol and straight chain alkylphenol or mixing together sulfurized straight chain alkylphenol and sulfurized branched chain alkylphenol. The former is preferred, providing a superior product.

For the most part, $m$ will be 0, and the composition will have the following formula:

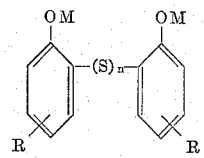

wherein $n$ is in the range of 1 to 3, more usually in the range of 1 to 2, the weight percent of sulfur is in the range of from about 5 to 15, preferably in the range of 10 to 15, M is hydrogen or calcium, the second valence of calcium being satisfied by another phenoxide, hydroxide or alkoxide of from 1 to 18 carbon atoms, and from 5 to 40 number percent of the R groups are straight chain alkyl groups of from 15 to 35 carbon atoms, more usually of from 15 to 30 carbon atoms, generally being bonded to the benzene ring at a secondary carbon, and from 95 to 60 number percent of the R groups are polypropenyl of from 9 to 18 carbon atoms, more usually of from 9 to 15 carbon atoms, preferably averaging at about 12 carbon atoms. The equivalent ratio of calcium to phenolic hydroxyl will generally be in the range of 0 to 2, usually about 0.05 and up to 1, more usually 0.1 to 0.5.

The R groups or alkyl groups may be present on any of the sites around the phenolic ring, i.e., ortho, meta or para. Preferably, the R groups will predominantly be meta or para. That is, less than 40 percent of the R groups will be in the ortho position and preferably less than 25 percent of the R groups will be in the ortho position. Numerous methods of isomerizing alkylphenols from the ortho to the other positions of the benzene ring are known. Generally, an acid catalyst is used such that the alkyl group migrates for the most part to the meta position.

Various methods of preparing sulfurized alkylphenols are known in the art. The particular method employed is not critical to this invention, although some methods will be favored over others, providing higher weight percents of sulfur. U.S. Patent No. 2,409,687 describes a method of sulfurizing using sulfur monochloride and the alkylphenol in an inert solvent. U.S. Patent Nos. 2,680,096 and 3,178,368 describe sulfurizing using sulfur with calcium phenoxide in the presence of ethylene glycol.

Depending on the method of sulfurization, various solvents or dispersants may be used. Illustrative of such solvents are oil, particularly hydrocarbonaceous fluids used as lubricating oils, inert hydrocarbons, both aromatic and aliphatic, etc. The concentration of the reactants may be varied widely. In sulfurizing with sulfur, the weight ratio of sulfur to alkylphenol will be in the range of 1:0.9–10, usually about 1:2–6. When calcium oxide is used as the catalyst, the weight ratio of sulfur to calcium oxide will generally be about 4–10:1. Ethylene glycol will usually be added in small amounts.

Elevated temperatures will be used, the degree depending on the particular reactants. Generally, temperatures for sulfurization with sulfur will be in the range of about 200° to 350° F. The reaction will be carried out so that the water of reaction is removed as formed or after most of the sulfurization has occurred.

The overbased phenates may now be prepared by combining the sulfurized alkylphenol prepared above, either neat or preferably in a suitable dispersant, at elevated temperatures with calcium, generally in the form of its oxide or hydroxide (lime), in the presence of a glycol— 2 to 3 carbon atoms—a high molecular weight alkanol, i.e., 8 carbon atoms or greater, and an alkaline earth metal sulfonate, followed by carbonation and then filtration. Normally, an antifoaming agent is then added, although the antifoaming agent may be added at any time during the preparation of the overbased phenate.

Before considering the particular process steps, the various materials to be used will be considered.

The basic sulfonates which are employed contain from 0 to 300 percent, usually 0 to 100 percent, of metal in excess of the metal of normal sulfonates—essentially neutral metal sulfonates. See U.S. Patent No. 3,178,368. By neutral metal sulfonates are intended sulfonates wherein the sulfonic acid moiety and the metal moiety are present in equivalent amounts. The nature of metal sulfonates permits an excess of metal cation to be dispersed in an essentially hydrocarbon medium, the excess metal cation probably being complexed.

The basic sulfonates used herein are derived from neutral sulfonates represented by the formula:

$$[(R^1)_a ASO_3]_2 M^1$$

wherein $R^1$ is a high molecular weight straight chain or branched chain, saturated or unsaturated, essentially hydrocarbon radical, usually aliphatic, having a molecular weight of about 150 to about 800; A is an aromatic hydrocarbon radical, such as benzene, naphthalene, anthracene, etc.; $a$ is a number having the value of 1 to 4; and $M^1$ is calcium.

Examples of suitable hydrocarbon radicals for the sulfonate are the following: dodecane, hexadecane, eicosane, triacontane radicals; radicals derived from petroleum hydrocarbons, such as white oil, wax, etc.; radicals derived from olefin polymers, such as polypropylene or polybutylene, etc. The sulfonic acids used in preparing the basic sulfonates of this invention also include the oil soluble sulfonic acids obtained from petroleum, such as the mahogany acids, and the synthetic sulfonic acids prepared by various methods of synthesis.

The metal sulfonates are exemplified as follows: calcium white oil benzene sulfonate, calcium dipolypropylene benzene sulfonate, calcium mahogany petroleum sulfonate, calcium triacontyl benzene sulfonate, etc.

The high molecular weight alcohol, which is used in amounts of not more than 75 weight percent of the sulfurized alkylphenol charge, preferably 10 to 50 weight percent, are those monohydric alcohols containing from about 8 to 18 carbon atoms, preferably 9 to 15 carbon atoms. These alcohols are exemplified as follows: octyl alcohol, decyl alcohol, dodecyl alcohol, tridecyl alcohol, tetradecyl alcohol, hexadecyl alcohol, etc.

A polyhydric alcohol of from 2 to 3 carbon atoms, usually ethylene or propylene glycol, is used. A sufficient amount of the glycol is employed to bring the reactants into efficient contact for substantial reaction in a reasonably short time; that is, the amount of alcohol used is sufficient to dissolve at least portions of the reactants and thus provide substantial contact between them. For this purpose it is beneficial to use certain ratios by weight of the calcium oxide or hydroxide to glycol. The calcium:glycol mole ratio may vary from 3 to 1 to about 0.25 to 1, preferably from about 2 to 1 to about 1 to 1.

The amount of calcium oxide or hydroxide used will depend on whether calcium cation has been used in the sulfurization of the alkylphenol and the amount of calcium desired in the final product. It is found that at least about 80 percent of the inorganic calcium added is incorporated into the product, so that an excess of from about 5 to 20 weight percent of calcium over that to be incorporated in the final product will be employed.

The weight ratio of the total amount of calcium source, e.g., calcium oxide or hydroxide, used—both during sulfurization and subsequent calcium addition—based on sulfurized alkylphenol will be from about 0.25 to 0.7, more usually from about 0.45 to 0.6.

The several components which are used in this process are used in certain mole proportions with respect to each other. For each mole of alkylphenol, it is desirable to use from 0.01 to 1 mole of sulfonate, preferably from about 0.01 to 0.05 mole, from 0.1 to 1.5 moles of high molecular weight alcohol, and at least about 1.5 to 4 moles of calcium.

The carbon dioxide used is from about 300 mole percent to 10 mole percent, preferably 150 mole percent to 10 mole percent of the alkylphenol charged.

Generally, when preparing the phenates, a lubricating oil will be used as a reaction medium. Thus, by such use of a lubricating oil, oil concentrates of the desired highly basic carbonated sulfurized calcium phenate can be obtained directly. Such lubricating oils include a wide variety of lubricating oils, such as petroleum derived oils: naphthenic base, paraffin base, asphaltic base and mixed base lubricating oils; other hydrocarbon lubricants, e.g., lubricating oils derived from coal products and the synthetic oils, e.g., alkylene polymers; as well as nonhydrocarbon lubricating oils such as the alkylene oxide type polymers; etc.

The amount of reaction medium, e.g., oil, will generally be from about 10 to 55 weight percent of the total composition, more usually from about 15 to 40 weight percent of the total composition during the reaction, and from about 35 to 45 weight percent of the final composition after removal of the glycol and high molecular weight alcohol.

Also included in the final composition is from about 0.0005 to 0.01 weight percent of the total composition of an antifoaming or defoaming agent; usually from about 0.001 to 0.005 weight percent. Numerous defoaming agents may be used such as silicones, silicates, fluorinated organic polymers, etc. As already indicated, the present invention is concerned with the effect of the composition with an antifoaming agent, rather than inhibiting foam completely in the absence of the antifoaming agent.

Illustrative antifoaming agents are DC–200 (dimethyl silicone polymer supplied by Dow-Corning Co.), SAG–47 (dimethyl silicone polymer fluid containing suspended silica supplied by Union Carbide Co.), DC FS–1265 (perfluorosilicone polymer supplied by Dow-Corning Co.), CD–100 (silicate by Nalco Co.), FX–161 (polytrifluorochloroethylene supplied by Minnesota Mining & Manufacturing Co.), etc.

In preparing the overbased carbonated sulfurized calcium alkylphenates, the order in which the various materials are combined is not critical with the exception of the carbonation. Generally, it is convenient to add all of the reactants with the exception of the sulfurized alkylphenol to the reactor, heat the reactants to a temperature in the range of about 300° to 400° F. and remove the water formed by the reaction between the lime and any hydroxylic species present. After removal of the water, the sulfurized alkylphenol is then added while maintaining an elevated temperature in the above-indicated range. Any additional water which is formed is then removed, the water usually bringing with it some glycol and high molecular weight alcohol.

After heating the reaction mixture for from about one-half hour to about two hours, carbonation is begun by introducing gaseous $CO_2$ into the reaction mixture at relatively moderate pressures, e.g., less than 50 p.s.i.g. The carbonation is exothermic and cooling may be required to maintain the temperature in the desired range. The temperature during carbonation is usually in the range of 275° to 375° F.

At the end of this time, the glycol is removed by distillation, using a moderate vacuum. Generally, the temperature is in the range of 350° to 500° F. and the pressure is in the range of about 10 to 150 mm. Hg. Also, as desired, from about 30 to 100 percent of the high molecular weight alcohol may be removed. The product is now ready to be used as a detergent in lubricating oils.

The composition and properties of the final product are as follows:

TABLE I

| | Composition, Weight Percent | |
|---|---|---|
| | Broad Range | Narrow Range |
| Sulfurized alkylphenol sulfur (combined with alkylphenol)[1] | 20-50 | 25-40 |
| Sulfonic acid | 3-8 | 2-3 |
| Carbon dioxide | 4-7 | 4-6 |
| $Ca$[2] | 8-11 | 4-6 |
| Monohydric alcohol (>8 carbon atoms) | 0-10 | ≥8-10 |
| | | 0-7 |
| | Properties | |
| Viscosity, SUS (ASTM D 446) 210° F | [3] 300-700 | |
| Foam tendency (ASTM D 892 Seq. I) (ml. foam)[4] | <60 | |
| Foam stability (ASTM D 892 Seq. I) (15 minutes) (ml. foam) | <10 | |

[1] Weight percent of S is included in sulfurized alkylphenol weight percent.
[2] The Ca is in combined form with the various acidic species present in the composition.
[3] The weight percent of oil will be in the range of 35 to 45 weight percent of the composition.
[4] Based on 200 mm./kg. in a 50 grade base oil.

The remainder of the composition is the base oil. Of course, the above indicated compositions may be diluted so that the above weight percents are relative to each other, but are not absolute. The base oil will usually be about 15 to 55 weight percent in the concentrate.

The following examples are offered by way of illustration and not by way of limitation.

*Example A.—Preparation of alkylphenol*

Into a kettle was introduced 150 pounds of warmed phenol, 20 pounds of Filtrol clay No. 20, the mixture heated under nitrogen to 300° F. and 170 pounds of cracked wax olefins of from 15 to 20 carbon atoms introduced over a period of 3 hours. At the completion of the addition of the olefins, the mixture was heated for an additional 3 hours at the same temperature. At the end of this time, the mixture was allowed to settle for 3 hours while being maintained at 180° F. A 102 g. sample was taken, filtered, stripped at 300° F. and 10 mm. Hg leaving 66 g.; 64.5 percent yield. Analysis by NMR spectrophotometer indicated 74 percent ortho substitution.

The product was worked up as indicated for the aliquot, yielding 198 pounds. Analysis: average molecular weight (ThermoNAM—Differential Vapor Pressure Technique) =360; acetic anhydride titration=152, 153.

*Example I.—Sulfurization of alkylated phenols*

Into a kettle was introduced 190 pounds of tetrapropenyl alkylphenol and 70.5 pounds of alkylphenol prepared as described in Example A, hydrocarbonaceous oil added as diluent, the mixture heated to 170° F. and 61 pounds of sulfur and 9.6 pounds of calcium oxide added. The temperature was then raised to 270° F. and 7.6 pounds of ethylene glycol added over 10 minutes while the temperature was being raised to 340° F. Water was removed overhead, the temperature being maintained for 18 hours. Analysis: percent sulfur=11.8; molecular weight (ThermoNAM)=626.

*Example II*

(A) Into a reaction vessel was introduced 520 g. of alkylphenol (75 mole percent tetrapropenylphenol:25 mole percent $n-C_{15-20}$ [sub-members stand for carbon atom range] alkylphenol [alkyl group derived from $C_{15-20}$ α-olefins obtained from cracking wax]) diluted with an equal volume of n-hexane and then heated to reflux. To the refluxing solution was slowly added 150 g. of sulfur monochloride. Heating was continued for about 3 hours and then the reaction mixture was swept with nitrogen, washed with water, then dilute aqueous sodium bicarbonate, followed by repeated water washes until the water was neutral to pH paper. The organic phase was then stripped free of hexanes leaving the sulfurized alkylphenol product. Analysis: 11.8 weight percent S.

(B) The above method was repeated using a mixture of alkylphenols having 85 mole percent tetrapropenyl phenol and 15 mole percent $n-C_{22-28}$ alkylphenol (alkyl group derived from $C_{22-28}$ α-olefins from ethylene polymerization). Analysis: percent S=13.0.

*Example III*

(A) Into a reaction vessel was charged 402 g. of Mid-Continent 100 neutral oil, 108.5 g. of decyl alcohol and 36.5 g. of basic calcium sulfonate (derived from 480 neutral oil) containing 40 percent calcium in excess of that amount for a neutral sulfonate, and the mixture heated to 170° F. and 155 g. of calcium hydroxide added. The temperature was raised to 270° F. while adding 88 g. of ethylene glycol, removing overhead any water formed. The temperature was maintained at 300°-310° F. while 330 g. of sulfurized alkylphenol (Example II–B) was added over a 45-minute period.

The temperature was raised to 340° F. and water continuously taken overhead. Carbon dioxide was introduced into the reaction mixture and 48 g. was added over about a two hour period. The volatile material was then removed by slowly lowering the pressure to about 40 mm. Hg and raising the temperature to about 390° F. The product was cooled and filtered. The filtered product weighed 989 g. Analysis of the product showed 8.82 percent Ca; 4.62 percent $CO_2$; 2.55 percent S; alkalinity value=243 mg. KOH/gm.

(B) The above example was repeated with the same materials under approximately the same conditions to provide a product having the following analysis: 8.76 percent Ca; 4.75 percent $CO_2$; 2.75 percent S; alkalinity value=239 mg. KOH/gm.

Aliquots of the product of Examples II–A and B, as well as a third product prepared in the same manner were combined and blended with a commercial SAE 50 oil at a concentration of 200 mm./kg., 30 ppm. of DC–200 was added and the mixture tested according to the ASTM D 892, Seq. I test. The results were foam tendency (ml. foam) 0; stability (min. 15) 0. By comparison, when an overbased phenate was used, prepared as previously described, except for having only tetrapropenyl groups, the respective values were 600 and 500.

*Example IV*

(A) Into a reaction vessel was charged 442 g. of tetrapropenylphenol (85 mol percent) and 128 g. of $n-C_{22-28}$ alkylphenol, the mixture heated to 170° F. and 128 g. sulfur and 20 g. calcium oxide added. The temperature was then raised to 270° F., 16 g. of ethylene glycol added, followed by raising the temperature to 340° F., which was maintained for 18 hours. The reaction mixture was then cooled and isolated.

(B) Into a reaction vessel was charged 402 g. of Mid-Continent 100 neutral oil, 1,085 g. of decyl alcohol, 365 g. of basic calcium sulfonate (derived from 480 neutral oil) containing 40 percent excess calcium, the mixture heated to 170° F. and 155 g. hydrated lime added. The temperature was raised to 275° F., followed by the addition of 88 g. ethylene glycol. The temperature was further increased to 310°–315° F. and 321 g. of the composition prepared in Part A added.

The water of reaction was then removed by heating the mixture to 340° F. for about one hour. The temperature was then lowered to 325°–330° F. and carbonation begun. Approximately 48 g. $CO_2$ was introduced over about 2.5 hours, at which time the pressure was lowered and the temperature slowly increased. Over a period of 1.5 hours, the pressure was dropped to 40 mm. Hg and the temperature increased to approximately 200° C. The product weighed 959 g. and filtered very well through a diatomaceous earth filter. Analysis: Percent Ca=8.75; $CO_2$=4.9; S=2.65; alkalinity value=237, 234 mg. KOH/gm.

The above sample was tested by compounding with two commercially available SAE 50 oils which are found to give very difficult foaming problems. Into one (I) oil was added 200 mm./kg. based on calcium of the above composition plus 30 p.p.m. of DC-200, while in the other (II) oil was added 60 mm./kg. based on calcium of the above composition plus 10 p.p.m. DC-200 and 10 p.p.m. SAG-47. Following the previously indicated tests, the results were as follows:

|  | I | II |
|---|---|---|
| Tendency (ml. foam) | 0 | 60 |
| Stability, 15 min. (ml. foam) | 0 | 0 |

*Example V*

(A) Following the procedure of III–A, 750 g. of tetrapropenylphenol and 310 g. of n-$C_{15-20}$ alkylphenol (alkyl derived from cracked wax olefins) were combined with 240 g. of sulfur and 38 g. of lime in the presence of 30 g. of ethylene glycol. The product had 12.0 weight percent sulfur.

(B) Into a reaction vessel was charged 402 g. of Mid-Continent 100 neutral oil, 108.5 g. decyl alcohol, 36.5 g. of basic calcium sulfonate (derived from 480 neutral oil) containing about 40 percent excess calcium, the mixture heated to 170° F. and 155 g. hydrated lime added, followed by raising the temperature to 270° F. and adding 88 g. of ethylene glycol. The temperature was then raised to 340° F. and water taken off overhead.

While maintaining the temperature, 310 g. of sulfurized alkylphenol prepared above was added over a period of 50 minutes and then the temperature raised to 390° F. and maintained for one hour while taking water overhead. The temperature was then lowered to about 325° F. and maintained while 54 g. of carbon dioxide was introduced over about a 2 hour and 45 minute period. After the addition of carbon dioxide was completed, the temperature was slowly raised to 390° F. and the pressure slowly dropped to 40 mm. Hg over a period of 2 hours. The product was filtered, filtering easily, and then analyzed. Analysis: Percent Ca=8.54.

The above composition was tested by compounding with a commercially available SAE 50 oil (Socony 50 F-18996) by adding 30 p.p.m. of DC-100 and 200 mm. (based on calcium) of the composition. Following the previously indicated tests, the results were as follows: Tendency=30 ml. (Crown of bubbles at 8 minutes); stability (10 minutes) (ml. foam)=0.

It is obvious from the above results that by using a combination of straight chain alkyl and polypropenyl substituted phenols for the preparation of overbased phenates, far superior overbased phenates are obtained. Not only is a serious foaming problem reduced to almost nil, but also much lower viscosity materials are obtained at high calcium weight percents. The lower viscosity makes the desirable higher calcium weight percents easier to work with and much more attractive, because the high calcium weight percents do not create handling problems.

The overbased phenates of this invention demonstrate excellent properties as detergents in diesel engines, marine engines, etc. The compositions of this invention, while providing the same or superior detergency well known for overbased phenates, avoid serious problems which have been related to their production and use.

As will be evident to those skilled in the art, various modifications on this invention can be made or followed, in the light of the foregoing disclosure and discussion, without departing from the spirit or scope of the disclosure or from the scope of the following claims.

We claim:

1. A composition of the formula:

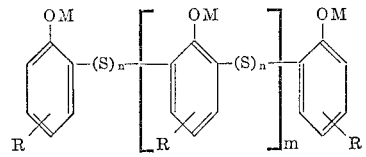

wherein $m$ is an integer in the range of 0 to 2, $n$ is an integer of from 1 to 3, M is hydrogen or calcium, with the proviso that when M is calcium, the second valence is satisfied by phenoxide, hydroxide or alkoxide of from 1 to 18 carbon atoms and R is an alkyl group, wherein from 5 to 40 number percent are straight chain alkyl groups of from 15 to 35 carbon atoms, and from 95 to 60 number percent are polypropenyl of from 9 to 18 carbon atoms, the weight percent of sulfur of said composition being in the range of 5 to 15.

2. A composition of the formula:

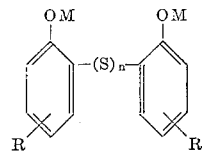

wherein $n$ is an integer in the range of 1 to 3, M is hydrogen or calcium, with the proviso that when M is calcium the second valence of calcium is satisfied by phenoxide, hydroxide or alkoxide of from 1 to 18 carbon atoms, R is an alkyl group having from 5 to 40 number percent as straight chain alkyl groups of from 15 to 35 carbon atoms and from 95 to 60 number percent of polypropenyl of from 9 to 18 carbon atoms, and the weight percent of sulfur is in the range of from about 5 to 15.

3. A composition according to claim 2, wherein $n$ is an integer of from 1 to 2, the straight chain alkyl groups are of from 15 to 30 carbon atoms, the polypropenyl groups are from 9 to 15 carbon atoms, and the equivalent ratio of calcium to phenolic hydroxyl is from about 0.05 to 1.

4. A composition according to claim 2, wherein increasing amounts of sulfur in said composition within the specified range are incorporated with decreasing number of carbon atoms and decreasing mole percent of the n-alkyl groups in the alkylphenol.

5. In a method for preparing overbased phenates, wherein a sulfurized alkyl phenol is combined with calcium oxide or hydroxide, in the presence of a glycol of from 2 to 3 carbon atoms, a high molecular weight alkanol of from 6 to 18 carbon atoms and an oil-soluble alkaline earth metal sulfonate, wherein the mole ratio of alkylphenol to calcium is in the range of 1:1.5–4, and the mixture then carbonated with carbon dioxide, and wherein an antifoaming agent is included in the composition in from 0.005 to 0.01 weight percent of said composition, the improvement which comprises having as the sulfurized alkylphenol a composition according to claim 1.

6. An overbased phenate composition prepared as described in claim 5.

7. A composition according to claim 1, wherein said composition is obtained by sulfurizing a mixture of polypropenyl substituted phenols and straight chain alkyl substituted phenols.

8. A composition according to claim 2, wherein said composition is obtained by sulfurizing a mixture of polypropenyl substituted phenol and straight chain alkyl substituted phenol.

9. A method of preparing a low foaming, low viscosity overbased phenate composition which comprises combining a composition according to claim 1 with lime, in the presence of a glycol of from 2 to 3 carbon atoms, an alkanol of at least 8 carbons, a calcium hydrocarbon sulfonate, wherein said hydrocarbon is from 150 to 800 molecular weight, and a liquid hydrocarbon reaction medium at temperatures in the range of 300° to 400° F., wherein the calcium to glycol mole ratio is in the range of 3–0.25:1, the alkylphenol to sulfonate mole ratio is in the range of 1:0.01–1, the mole ratio of alkylphenol to alkanol is in the range of 1:0.1–1.5 and the lime to alkylphenol mole ratio is in the range of 1.5 to 4, removing the water of reaction overhead, adding carbon dioxide in an amount of from 10 to 300 mole percent based on alkylphenol, distilling glycol and alkanol overhead, leaving from 0 to 70 weight percent of the alkanol and adding from 0.0005 to 0.01 weight percent of the total composition of an antifoaming agent.

References Cited
UNITED STATES PATENTS

| | | | |
|---|---|---|---|
| 2,703,786 | 3/1955 | Young et al. | 252—42.7 |
| 3,033,789 | 5/1962 | Asseff | 252—49.6 X |
| 3,178,368 | 4/1965 | Hanneman | 252—42.7 X |
| 3,210,277 | 10/1965 | Swift | 252—42.7 |

DANIEL E. WYMAN, *Primary Examiner.*

PATRICK P. GARVIN, *Examiner.*